United States Patent

Rourke

[11] Patent Number: 5,943,850
[45] Date of Patent: Aug. 31, 1999

[54] APPARATUS AND METHOD FOR USE IN HARVESTING CROPS OF THE GENUS BRASSICA

[76] Inventor: David R. S. Rourke, Box 144, Minto, Canada, R0K 1M0

[21] Appl. No.: 09/005,595
[22] Filed: Jan. 9, 1998
[51] Int. Cl.$^6$ ..................................................... A01D 73/00
[52] U.S. Cl. .......................... 56/189; 56/190; 56/DIG. 1; 172/247
[58] Field of Search ................................. 56/189, 16.4 R, 56/16.4 A, 190, DIG. 1; 172/247, 253

[56] References Cited

U.S. PATENT DOCUMENTS 2,999,697  9/1961  Winget ................................ 172/247 X

FOREIGN PATENT DOCUMENTS 940460  of 0000  France .................................... 172/247

Primary Examiner—Terry Lee Melius
Attorney, Agent, or Firm—Adrian D. Battison; Murray E. Thrift

[57] ABSTRACT

A method of harvesting crops of the type falling in the genus Brassica comprises lodging the crops using a crop pusher assembly transported by a tractor and including a stationary crop pushing surface which is inclined downwardly and rearwardly from an upper top edge to a position adjacent the ground. The surface is convex and includes a bottom pivotal flap for following ground contour. The standing crop is moved to a lodged position against the ground without cutting or breaking the crop stems. This prevents shattering of the crop by maintaining the crop in the lodged position and causes the crop to continue to mature by maintaining the stems without cutting or breaking. After the crop has matured, the lodged crop is cut with a header of a combine harvester for harvesting the crop.

20 Claims, 4 Drawing Sheets

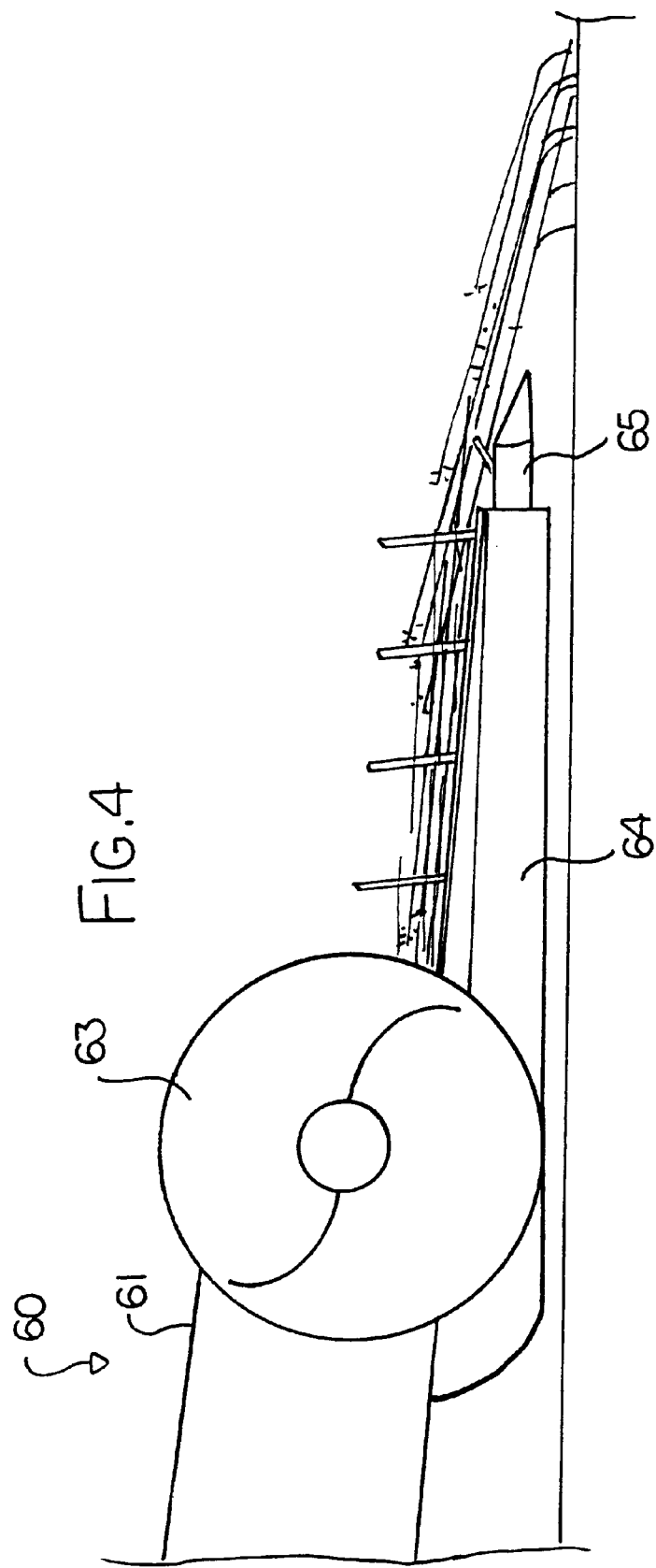

APPARATUS AND METHOD FOR USE IN HARVESTING CROPS OF THE GENUS BRASSICA

This invention relates to an apparatus and method for use in harvesting crops such as Canola, Mustard, Crambe and others which fall in the genus Brassica.

BACKGROUND OF THE INVENTION

Harvesting of seed crops is generally carried out on a commercial scale using a combine harvester to collect the crop heads and a portion of the straw or stalk and to separate the seeds from the remaining material for collection on the combine harvester.

In some cases the combine harvester includes a straight cut header which cuts the crop from its standing position in the field.

In other cases, it is desirable to separately and previously cut the crop from its standing position to form a lying swath of the crop which is left to dry in the swath condition before the crop from the swath is lifted into the combine using a pickup type header for separation of the seeds from the remaining crop materials.

Both the straight cut technique and the swathing technique have advantages in different crop conditions.

The same techniques are used in regard to crops in the genus Brassica which includes amongst others Canola, Mustard and Crambe. However it is also known that care has to be taken in the harvesting of these crops in that if they are left to stand in the field for an extended period of time, the crop is prone to shattering in which movement of the crop in the wind or other weather conditions causes pods to break open releasing the seeds from the crop to be deposited on the ground where they are lost to the harvesting process and can cause problems in later years. In many cases, therefore, the swathing technique is the method currently preferred.

Some experimental or research work has been carried out in Sweden in which small or research plots of this crop have used simple relatively crude techniques to flatten or lodge the crop. This has been done mainly to hold narrow swaths in place since narrow width swaths do not have sufficient bulk and tend to break up in any windy conditions. No publications describing this work are known.

SUMMARY OF THE INVENTION

It is one object of the present invention, therefore to provide an improved method and apparatus for use with crops of the type falling in the genus Brassica which allows an improved efficiency of harvesting reducing crop loses and improving crop quality.

According to one aspect of the invention there is provided a method of harvesting crops of the type falling in the genus Brassica comprising:

providing a crop pusher assembly including a crop pushing surface;

transporting the crop pushing surface through a plurality of standing crop stems of the above type;

engaging the pushing surface with the standing crop so as to push the standing crop from a standing position to a lodged position against the ground;

the pushing being effected without cutting or breaking the crop stems;

preventing shattering of the crop by maintaining the crop in the lodged position;

causing the crop to continue to mature by maintaining the stems without cutting or breaking;

and after the crop has matured, cutting the lodged crop with a header of a combine harvester and harvesting the crop.

Preferably the crop pushing surface comprises a surface which is inclined downwardly and rearwardly from an top forward edge to a bottom trailing edge.

Preferably the surface is maintained substantially stationary as it is moved forwardly through the crop.

Preferably the surface is convexly curved from the top edge to the bottom edge.

Preferably the surface is convexly curved from a substantially vertical portion at the top edge to a portion at the bottom edge which is at an angle to the vertical and inclined downwardly and rearwardly.

Preferably the surface includes a bottom flap portion which can pivot upwardly and downwardly about a generally horizontal axis so as to increase and decrease a distance from the ground.

Preferably the bottom flap portion is connected to a main body of the surface by a hinge and is spring biased downwardly toward the ground.

Preferably the surface is formed by a flexible sheet, preferably of a plastics material.

Preferably the stems are substantially horizontal in the lodged position.

Preferably there is provided a crop divider at each end of the pusher surface.

Preferably the crop divider at each end of the pusher surface is adjustable in a direction upwardly and downwardly relative to the ground.

Preferably the header of the combine harvester moves in a direction so as to approach the crop from the upper end of the stems toward the bottom end connected to the ground.

According to a second aspect of the invention there is provided an apparatus for pushing crops for lodging of the crops on the ground comprising:

a frame having mounting elements thereon for attachment to a transport tractor;

a crop pushing surface mounted on the frame for movement therewith across the ground for engaging the pushing surface with the standing crop so as to push the standing crop from a standing position to a lodged position against the ground;

wherein the crop pushing surface comprises a surface which is inclined downwardly and rearwardly from a top forward edge to a bottom trailing edge;

and wherein the surface is maintained substantially stationary as it is moved forwardly through the crop.

BRIEF DESCRIPTION OF THE DRAWINGS

One embodiment of the invention will now be described in conjunction with the accompanying drawings in which:

FIG. 4 is a side elevational view of a pick-up section only of a combine harvester showing harvesting of the crops of FIG. 3.

DETAILED DESCRIPTION

Figure 1:
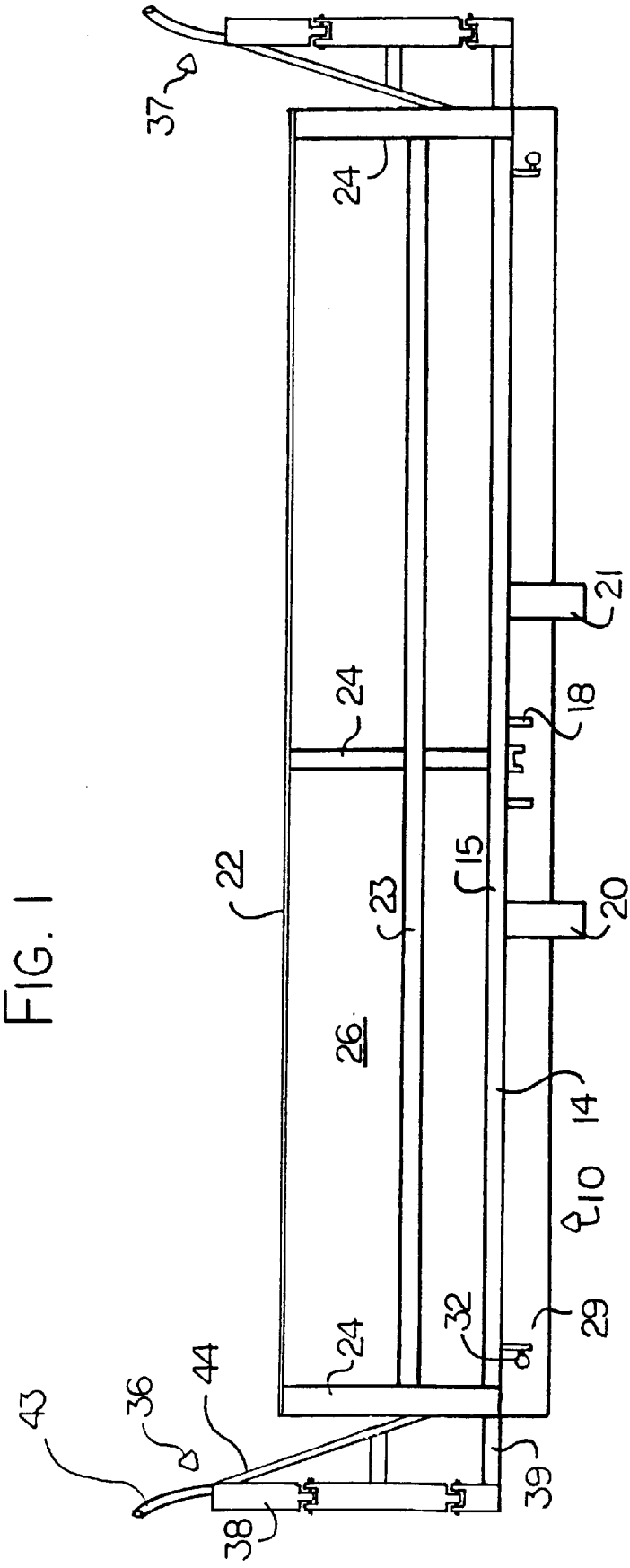
FIG. 1 is a top plan view of a crop pusher apparatus according to the present invention.
Figure 2:
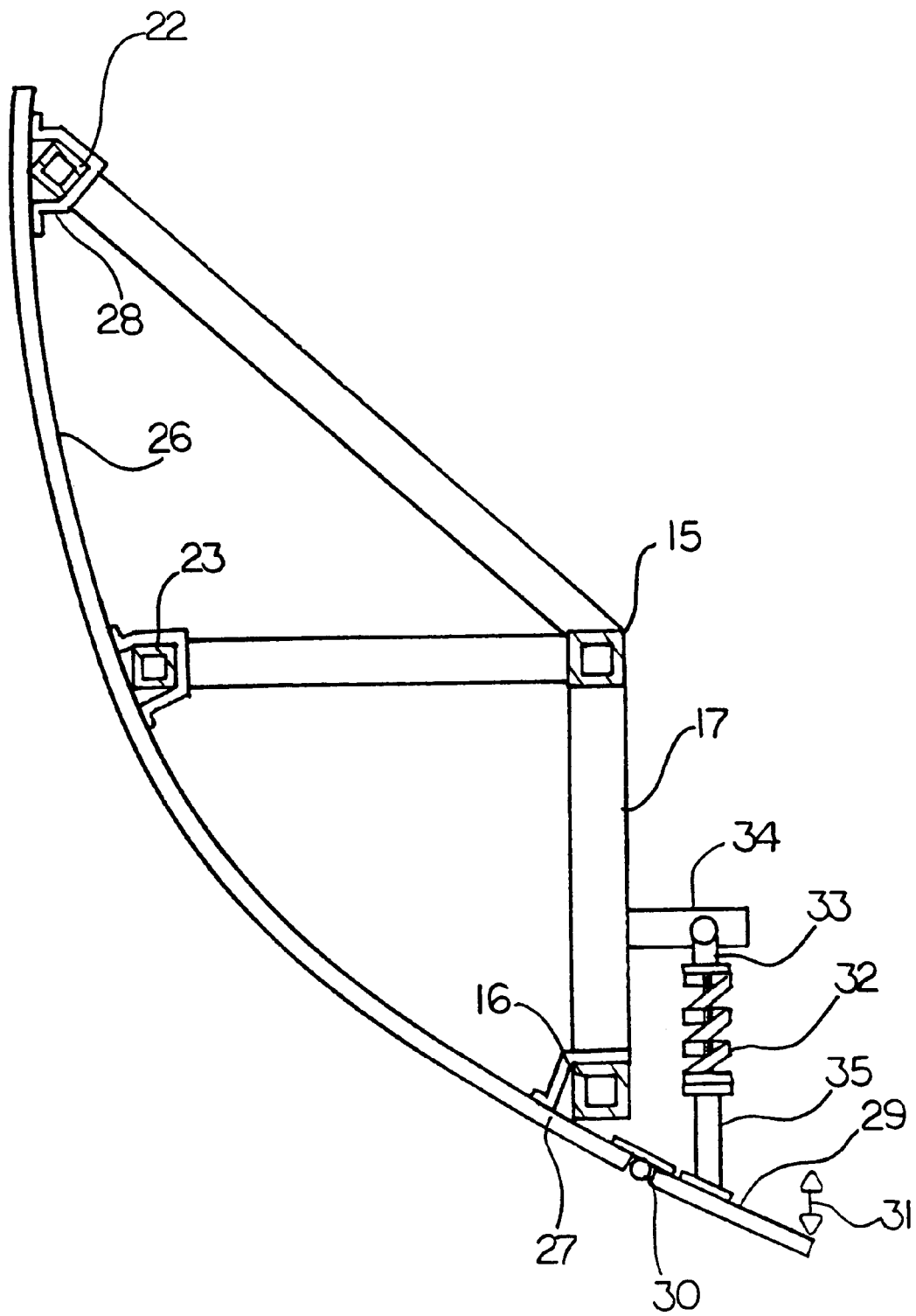
FIG. 2 is a vertical cross-sectional view of the apparatus of FIG. 1.
Figure 3:
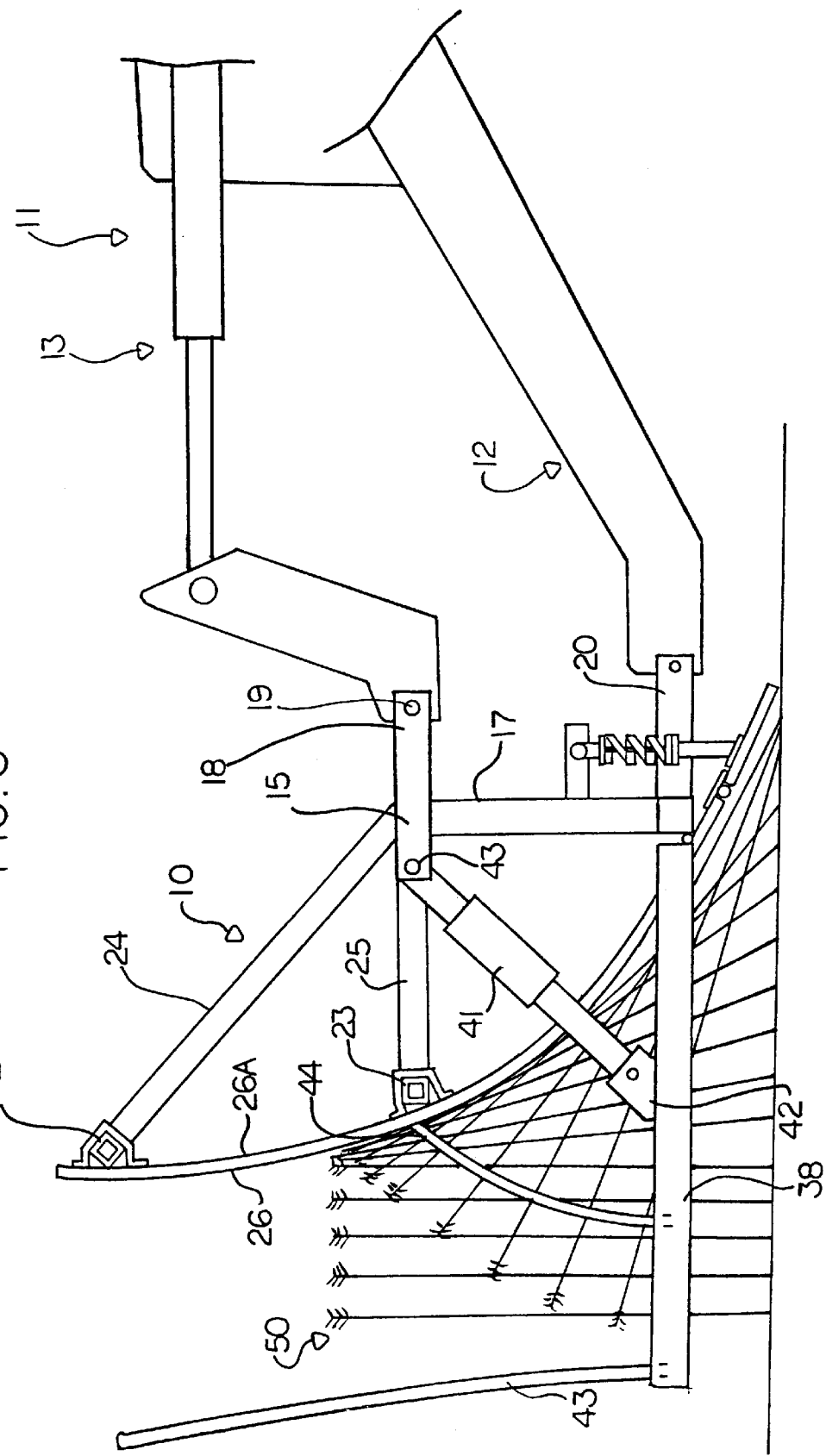
FIG. 3 is a cross-sectional view similar to that of FIG. 2 showing the apparatus in operation.

An apparatus for pushing a standing crop is shown in FIGS. 1, 2 and 3 indicated at 10 and is arranged for mounting on a suitable tractor vehicle 11 for movement with the vehicle in front of the vehicle in front of the vehicle in a pushing action. The vehicle is preferably a swather type tractor having a pair of forwardly extending arms 12 and a centre coupling 13 arranged for mounting and supporting the apparatus in a slightly floating action so the apparatus can lift in the event of impact with a rigid obstacle.

While the swather tractor is particularly convenient, other tractor vehicles or power units can be used in which case the mounting arrangements for the apparatus may be varied in accordance with requirements. For example the apparatus may be mounted on a high clearance sprayer or a conventional tractor with narrow wheels.

The apparatus comprises a main frame 14 including a first horizontal beam 15 and a second horizontal beam 16 directly below the first. The beams extend across substantially the full width of the apparatus and are interconnected by a series of vertical posts 17 at suitably spaced positions along the length of the beams to provide a substantially rigid structure. For attachment to the swather tractor, the top beam 15 includes a bracket 18 for receiving a transverse pin 19 of the mounting 13 of the tractor vehicle. The bottom beam 16 carries a pair of rearwardly extending brackets 20 and 21 each for attachment to a respective one of the arms 12 of the tractor vehicle.

The shape and arrangement of the mounting bracket is of course available for modification depending upon the type of tractor to which the apparatus is to be attached.

The main frame of the apparatus further includes a top forward rail 22 and an intermediate rail 23 which is supported upon the beams 15 and 16 and extend outwardly and forwardly therefrom. The top rail 22 is upwardly of and forwardly of the intermediate rail 23. Each of the rails is connected to the frame by a plurality of arms 24 and 25 which extend from the beam 15 forwardly at spaced positions along the length of the rails so as to hold the rails infixed position forwardly of the beam 15.

The apparatus further includes a curved pusher plate 26 which is formed of a semi rigid sheet of a suitable plastics material such as polyethylene which has sufficient rigidity to remain substantially in the curved position illustrated while allowing sufficient flexibility to allow the sheet to be curved and some flexibility to resilient deform in the event of impact with an obstacle. The sheet forming the pusher plate 26 is smoothly curved so as to substantially follow the arc of a circle and extends from a substantially vertical portion at the rail 22 past the rail 23 to a rear portion 27 at the beam 16 which is inclined downwardly and rearwardly. The sheet 26 is attached to the rails 22 and 23 and to the beam 16 by brackets 28. A rear flap portion 29 is attached to the lower end 27 of the sheet 26 by a hinge 30 which allows the lower flap portion to pivot upwardly and downwardly as indicated by the arrow 31. In a rest position, the flap portion 29 is maintained such that it follows the curvature of the sheet 26 and particularly is in effect contiguous with the bottom portion 27. However the flap portion can also pivot about the hinge 30 against the bias of a spring 32. The spring 32 is mounted on a pin 33 which is pivotally connected to a bracket 34 at its upper end attached to one of the posts 17. At its lower end the spring pushes on a lower bracket 35 attached to the rear face of the flat portion 29. The flap portion can therefore pivot upwardly and downwardly to accommodate slight changes in ground height or minor obstacles and also to maintain a substantially constant pressure against the crop material to be pushed. In the event that the crop material exceeds a predetermined amount, the flap portion will pivot upwardly under pressure from the underlying crop material. In the event that the amount of crop material decreases, the flap portion will pivot downwardly to increase the pressure.

At each end of the crop pusher is provided a crop deflector 36, 37 for engaging the crop beyond each end of the sheet 26 to pull crop into the area of the sheet for pushing under the sheet. Thus each crop deflector comprises a main deflector arm 38 mounted on an extension portion 39 of a bottom beam 16. The arm extends forwardly and is mounted on a hinge 40 allowing upward and downward movement of the arm. Movement is effected by a hydraulic cylinder 41 connected between a bracket 42 on the arm and a bracket 43 on an extension of the beam 15. The arm carries a plurality of crop guide fingers 43 and 44 which act to direct the crop inwardly. The height of the forward end of the arm 38 can be raised and lowered in order to accommodate crop conditions and changes in ground height.

In operation, the crop pushing apparatus is transported through the field containing the standing crop 50. The crop material is engaged by the crop deflectors and pushed inwardly to a position forwardly of the crop pushing sheet 26. The sheet engages the crop initially at its upper part indicated at 26A and commences pushing the crop over so that the crop is distorted and compressed forwardly and downwardly to lodge the crop onto the ground in a compressed mass which remains compressed and folded forwardly due to the interengagement between the crop stems in the folded condition. No cutting action occurs and the crop is simply distorted forwardly. The stems remain substantially intact so that there remains communication of fluids through the stem from the ground to the heads. However the crop is pushed over and lies generally flat against the ground. Generally the action is effected in strips of the same width as the pusher with the strips being in the opposite directions across the field. The crop dividers ensure that the crop material is divided into one lodge strip or a next adjacent lodge strip with little or no crop remaining standing between the strips.

The crop remains in the lodged condition for a period in the range 10 days to 20 days. During this time fluids continue to be communicated from the roots of the crop to the heads of the crop to ensure that maturing of the crop continues. However the crop is protected from damage by wind or other weather conditions so that the heads are not shaken or shattered by the weather condition and remain protected in dose proximity to the ground.

Normally the lodging action will occur when the crop has reached normal swathing stage, which is well known to one skilled in the art and is often detected at 10 to 50% seed turn. The lodging action is effected prior to the crop reaching a condition where the heads can shatter and this is normally detected by seed color change within the pod. The last insert days of maturation therefore take place in the lodged condition and complete maturation is normally detected by sampling for dry seed.

When maturation is detected and the weather conditions are suitable, the crop is harvested using a combine harvester schematically indicated in FIG. 4 where the combine is schematically indicated at 60. The combine harvester is of course shown only schematically since this is well known to one skilled in the art. The illustration shows a feeder house 61 attached to a header 62 having a auger transport system 63, a table 64 and a sickle knife 65. As shown the header of the combine harvester is moved in a direction opposite to the direction of lodging so that the heads of the crop feed firstly into the header of the combine harvester and the stems of the crop are cut by the sickle knife 65 as they are reached by the sickle knife as it projects forwardly from the table 64. Lifter guards may be used advantageously to ensure even flow into the combine header. The use of this process with the above defined crop materials provides an arrangement in which the crop can be properly lifted into the combine harvester. Thus this crop material does not fracture from the seed pods when lodged in this manner so that it retains some resilience maintaining the pods at a position spaced from the ground sufficient to allow the header to pass under the heads and lift the heads onto the table for harvesting.

This harvesting method using the lodging of the above defined crop provides a method in which the crop is lodged using the curved sheet and the spring flap so that it is lodged without fracturing, cutting or breaking of the crop stems. As the lodging occurs without cutting, breaking or fracturing, the crop continues to mature as there continues to be a translocution of the necessary fluids from the roots to the seed pods. However the lodging action has the advantages that the crop heads are protected from weather conditions particularly wind to reduce shattering of the crop that is the breaking of the heads and the dispensing of the seeds which is particularly prevalent in the above defined crop type. The lodging also has the additional advantages that there is a more compete material maturation and that there is potentially less green seed and higher yield.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of harvesting crops of the type falling in the genus Brassica comprising:

providing a crop pusher assembly including a crop pushing surface;

transporting the crop pushing surface through a plurality of standing crop stems of the above type;

engaging the pushing surface with the standing crop so as to push the standing crop from a standing position to a lodged position against the ground;

the pushing being effected by bending the crop stems without cutting and substantially without breaking the crop stems;

preventing shattering of the crop by maintaining the crop in the lodged position;

causing the crop to continue to mature by maintaining the stems without cutting and substantially without breaking;

and after the crop has matured, cutting the lodged crop with a header of a combine harvester and harvesting the crop.

2. The method according to claim 1 wherein the crop pushing surface comprises a surface which is inclined downwardly and rearwardly from a top forward edge to a bottom trailing edge.

3. The method according to claim 1 wherein the crop pushing surface is carried on a support and is maintained substantially stationary relative to the support as it is moved forwardly through the crop.

4. The method according to claim 2 wherein the crop pushing surface is convexly curved from the top forward edge to the bottom trailing edge.

5. The method according to claim 4 wherein the surface is convexly curved from a substantially vertical portion at the top forward edge to a portion at the bottom trailing edge which is at an angle to the vertical and inclined downwardly and rearwardly.

6. The method according to claim 1 wherein the crop pushing surface includes a bottom flap portion which can pivot upwardly and downwardly relative to a main body portion of the crop pushing surface about a generally horizontal axis so as to increase and decrease a distance of the bottom trailing edge from the ground.

7. The method according to claim 6 wherein the bottom flap portion is connected to the main body portion of the crop pushing surface by a hinge.

8. The method according to claim 6 wherein the bottom flap portion is spring biased relative to the main body portion downwardly toward the ground.

9. The method according to claim 1 wherein the crop pushing surface is formed by a flexible sheet.

10. The method according to claim 1 wherein the stems are bent to a position in which they are substantially horizontal in the lodged position.

11. The method according to claim 1 wherein the crop is divided by a crop divider at each end of the crop pushing surface.

12. The method according to claim 1 wherein the a crop divider at each end of the crop pushing surface is adjustable in a direction upwardly and downwardly relative to the ground.

13. The method according to claim 1 wherein the header of the combine harvester moves in a direction so as to approach the crop from the upper end of the stems toward the bottom end of the stems which is connected to the ground.

14. Apparatus for pushing crops for lodging of the crops on the ground comprising:

a frame having mounting elements thereon for attachment to a transport tractor;

a crop pushing surface mounted on the frame for movement therewith across the ground for engaging the crop pushing surface with the standing crop so as to push the standing crop from a standing position to a lodged position against the ground;

wherein the crop pushing surface comprises a surface which is inclined downwardly and rearwardly from a top forward edge to a bottom trailing edge;

and wherein the surface is mounted on the frame such that it is maintained substantially stationary relative to the frame as it is moved forwardly through the crop.

15. The apparatus according to claim 14 wherein the crop pushing surface is convexly curved from the top forward edge to the bottom trailing edge.

16. The apparatus according to claim 15 wherein the crop pushing surface is convexly curved from a substantially vertical portion at the top forward edge to a portion at the bottom trailing edge which is at an angle to the vertical and inclined downwardly and rearwardly.

17. The apparatus according to claim 14 wherein the crop pushing surface includes a bottom flap portion which can pivot upwardly and downwardly relative to a main body portion of the crop pushing surface about a generally horizontal axis so as to increase and decrease a distance of the bottom trailing edge from the ground.

18. The apparatus according to claim 17 wherein the bottom flap portion is connected to the main body portion of the crop pushing surface by a hinge and wherein the bottom flap portion is spring biased downwardly toward the ground.

19. The apparatus according to claim 14 wherein the crop pushing surface is formed by a flexible sheet.

20. The apparatus according to claim 14 wherein there is provided a crop divider at each end of the crop pushing surface which is adjustable in a direction upwardly and downwardly relative to the ground.

* * * * *